US008166237B1

(12) United States Patent  (10) Patent No.: US 8,166,237 B1
Atsatt et al.  (45) Date of Patent: Apr. 24, 2012

(54) CONFIGURABLE ALLOCATION OF THREAD QUEUE RESOURCES IN AN FPGA (75) Inventors: Sean R. Atsatt, Santa Cruz, CA (US); Kent Orthner, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 364 days.

(21) Appl. No.: 12/605,222

(22) Filed: Oct. 23, 2009

(51) Int. Cl.
*G06F 12/00* (2006.01)
(52) U.S. Cl. ......... 711/105; 711/147; 711/202; 711/221
(58) Field of Classification Search .................. None
See application file for complete search history.

(56) References Cited

U.S. PATENT DOCUMENTS

7,928,770 B1 * 4/2011 Bellis et al. ..................... 326/96
* cited by examiner

*Primary Examiner* — Shawn X Gu
(74) *Attorney, Agent, or Firm* — Weaver Austin Villeneuve & Sampson LLP (57) ABSTRACT

A programmable logic device includes a hard-logic portion that selectively aggregates bandwidth of data ports and maps logically and physically the transactions from these ports. The memory interface structure is a part of a hard-logic portion that includes random access memories (RAMs), multiplexers, and pointers that allow static or dynamic bandwidth configuration as function of instruments examining the system traffic using queues. The interface allows many initiators having many logical threads to share and use many physical threads in different queue modules.

22 Claims, 8 Drawing Sheets

CONFIGURABLE ALLOCATION OF THREAD QUEUE RESOURCES IN AN FPGA

FIELD OF THE INVENTION

This invention relates generally to hardware and techniques for use on a field programmable gate array (FPGA). More specifically, this invention relates to hardware and techniques for communicating between initiators and an external memory device.

BACKGROUND OF THE INVENTION

Double-data-rate (DDR) dynamic random access memory (DRAM) is a high performance, low-cost memory. DDR capture registers and half-data-rate (HDR) registers allow safe transfer of data from the DDR domain (data on both edges of clock) down to the single data rate (SDR) domain (data on positive edge of clock, but at twice the data width) down to HDR domain where data on positive edge of clock, but the frequency is now half that of the SDR, and data width is doubled.

Design of a memory interface from a PLD to an external memory device utilizes many inputs, such as allocation of bandwidth to data ports, buffering requirements, maintaining transaction ordering, trade-offs of buffer depths versus scheduling efficiency versus allowed latency, and packet size of write data. Transactions that must be returned in order at the master interface are referred to as threads in this document. Many or all of these inputs are determined only during the electronic design (the soft-logic portion of the PLD) is made. Thus, memory interface including thread queue systems has been typically implemented in soft-logic.

In other hardware contexts, such as ASICs, thread queue systems used with external memory schedulers do not require the allocation flexibility as those of PLDs because most or all of these inputs are known when the chip is built. For example configuration of queue time sharing between masters or initiators for selecting the available bandwidth from an aggregate master is a function that only occurs after embedded resources in an FPGA are created. A hard-logic implementation of a memory interface structure for an FPGA has to be flexible to cover a variety of possible input values.

SUMMARY OF THE INVENTION

A programmable logic device (PLD) includes a memory interface structure that selectively aggregates bandwidth of data ports and configurably maps logically and physically the transactions from these ports to allow efficient scheduling of transactions to a memory controller.

The memory interface structure is a part of a hard-logic portion of the PLD that includes random access memories (RAMs), multiplexers, and pointers that allow static or dynamic bandwidth configuration as function of instruments examining the system traffic. Bandwidth allocation is configured using pointer based buffer allocation in a shared or centralized memory. Allocation of buffering requirements is stored and may be updated in registers controlled by control logic or a processor. The allocation may depend on various memory and clock speeds, DDR widths, user logic frequency, number of initiators and threads, traffic patterns, packet sizes, logical thread properties, and thread queue depths. The hard-logic portion supports a command queue, data queue, and response queue each having centralized buffer RAM and a sufficiently high number of physical threads that may support any number of logical threads and be aggregated into larger bandwidth ports. The hard-logic portion may also include the scheduler and/or the DDR controller.

Initiators may generate multiple logical threads and may be grouped and shared by bandwidth ports. Command or data from a logical thread enters a physical thread in a queue module where it is buffered in centralized RAM based on configurable pointer based allocation. A memory scheduler selects the buffered command or data to send to the DDR controller using its thread properties (e.g., quality of service requirements and bandwidth requirements). After the command is completed, the DDR response may be aligned and arbitrated back to the initiator at the correct data rate in the response queue using multiplexers.

These and other features and advantages of the present invention may best be understood by reference to the following description taken in conjunction with the accompanying drawings.

DETAILED DESCRIPTION OF THE INVENTION

The present invention will now be described in detail with reference to a preferred embodiment thereof as illustrated in the accompanying drawings. In the following description, specific details are set forth in order to provide a thorough understanding of the present invention. It will be apparent, however, to one skilled in the art, that the present invention may be practiced without using some of the implementation details set forth herein. It should also be understood that well known operations have not been described in detail in order to not unnecessarily obscure the present invention.

A hardware device that is at least partially programmable may include both silicon implemented hardware and programmable logic hardware. A silicon implemented portion of hardware may be referred to as hard-logic. The hard-logic cannot be altered by a user or an electronic designer. The hard-logic portion usually includes an interconnect fabric and may include a processor, memory, or one or more interfaces to an external device. In contrast, programmable logic hardware may be referred to as programmable logic or soft-logic. The soft-logic portion is the programmable portion of the PLD and may be designed to include various components such as a soft-core processor, compiled memory, digital controllers, and various interfaces. An electronic designer/user programs the soft-logic portion so that the PLD functions as desired.

External memory devices are often used in conjunction with a programmable logic device. One popular external memory is dynamic random access memory (DRAM), for example, Double Date Rate (DDR) SDRAM memory, as a high performance and low-cost memory solution. One example of DDR SDRAM is DDR2. DDR2 includes 8 banks that can respond to a request at the same time. Each bank contains many pages and has one page open at a time. The response from a bank to a reading request for an open page can be very fast. Switching between reading and writing for an open page takes more time. If the data location is not in an open page, the response may be even slower because a different page is opened before the command is completed. In certain designs, commands from the PLD to the external memory take into account these memory specific traits so as to maximize efficiency. In the DDR2 example, all 8 banks may be accessed each time and commands that result in a faster response may be processed first. In some cases, pages may be opened in anticipation of a read or write command yet to be received.

Information exchanged between the external memory device and the PLD may be managed by a memory interface. Such a memory interface may include an interconnect interface, a scheduler, and a memory controller. A memory controller may be a part of the memory interface as part of the PLD or a part of the external memory device. Given the variety of memory specific traits, the memory controller is typically a part of the external memory device. The scheduler may be required to efficiently use the external memory device, such as a DDR, for many applications.

The interconnect interface communicates with the PLD directly through with one or more initiators where the memory commands initiate. A memory command may be a read command or write command. A read command is accompanied by information indicating the location of the desired data. A write command is accompanied by the data to be written. The memory device responds to a read command by sending the desired data and optionally other related information and responds to a write command by sending the location where the data is written.

Initiators issue memory commands in one or many threads. A thread is a list of commands that must be executed in order. An initiator may be associated one or many threads, referred to here in as a logical thread, but a thread may also correspond to one or many initiators. Typically, each thread has its own quality of service (QOS) requirements, such as bandwidth and latency. QOS requirements may also include other performance, synchronization, and level of service parameters.

Figure 1:
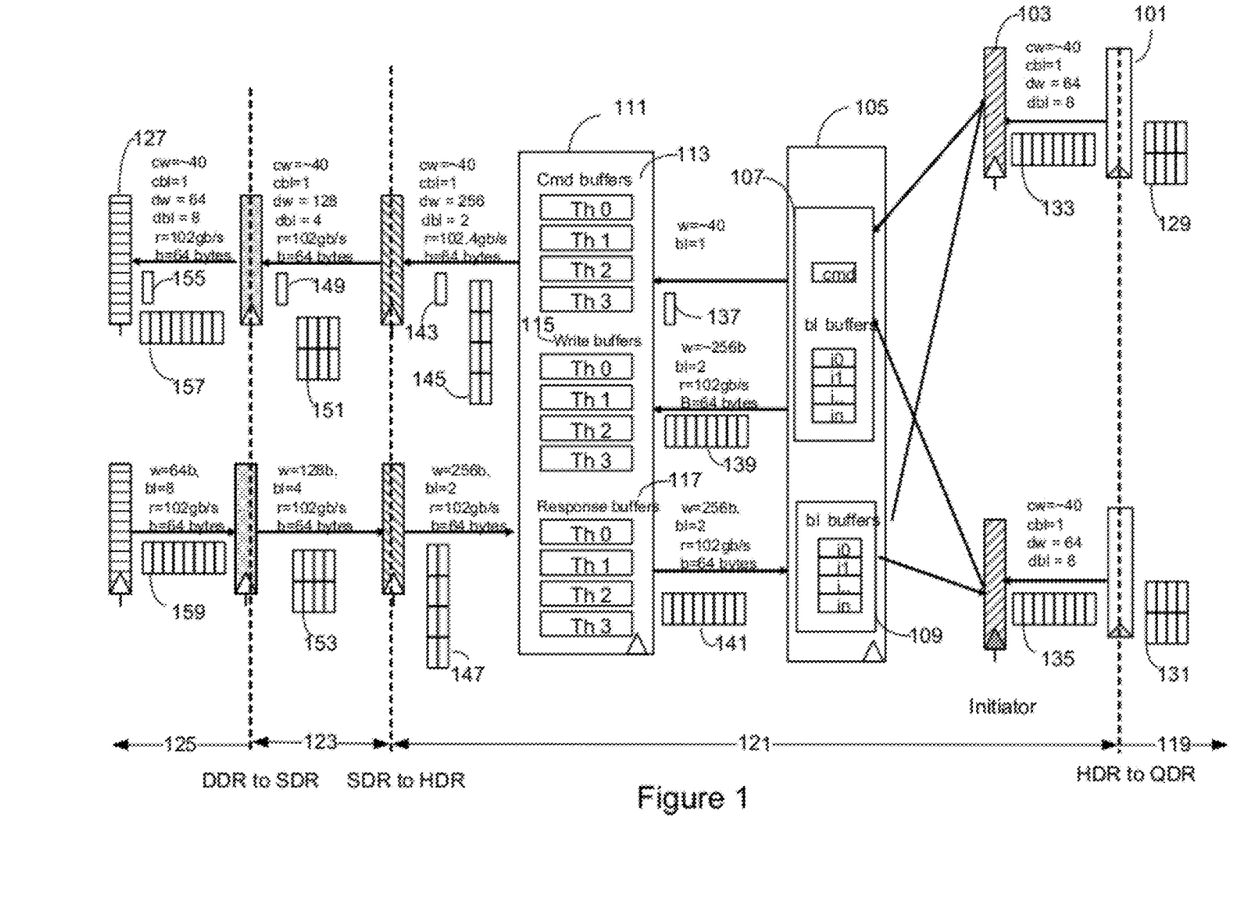
FIG. 1 is an example data path schematic for 64 bit DDR3.

The command information in the threads are passed through the interconnect interface via command and response buffers to the scheduler. FIG. 1 is an example data path schematic. Commands travel from the right side of the Figure to the left and responses from the memory travel from the left side to the right. Commands from user logic 101 and initiators 103 are sent to the interconnect interface 105. The interconnect interface 1-5 may include buffers 107 and 109. In the depicted interconnect interface, a command buffer 107 receives the commands from the initiators 103 and a response buffer 109 sends the response to the initiators 103. The scheduler 111 may also include various buffers. Three types of buffers are shown in the depicted scheduler 111: command buffers 113, write buffers 115, and response buffers 117. Note that each buffer may be further subdivided into a number of different physical threads. These buffers and physical threads may be located in different internal memory or a central memory location.

A number of different frequencies are utilized in this data path. To keep up with the DDR memory running a double data rate at 125 and the memory controller running at a single data rate at 123, the schedule must run at least at half DDR clock at 121 to keep latency reasonable and to keep data path width in the scheduler reasonable, for example, at 256 bits for a 800 MHz DDR3. The logic element or the user logic 101 feeding the initiator 103 runs at ¼ DDR clock at 119.

At the user logic, data 129 and 131 have a data width of 128 bits (2 blocks wide of 64 bits each) and a burst length of 4 blocks. At the initiator, data 133 and 135 have data width of 64 and a burst length of 8 blocks, and commands have a data width of about 40 and a burst length of one block. Data is sent from the interconnect interface 105 to the scheduler 111. The command 137 may have a width of about 40 and burst length of one. The data scheme does not change for the command at 143, 149, and 155 as the command travels to the external memory at 127. From the interconnect interface and the scheduler, the write data (139 and 145) and response data (141 and 147) may be about 256 bits wide with a burst length of two for a burst size of 64 bytes. Write (151) and response (153) data may be 128 bits wide with a burst length of 4, while maintaining a burst size of 64 bytes. At the memory, the data 157 and 159 may be 64 bits wide with a burst length of 8. The data rate through this data path may be 102.4 Gigabits per second. Assuming an 800 MHz DDR and 200 MHz user logic, the preferred number of burst length buffers may be 4 to maximize utilization of bandwidth.

The scheduler selects the best thread to move between the external memory and the interconnect fabric to meet quality of service (QOS) and efficiency requirements. Typically, the scheduler is designed to minimally meet QOS requirements while optimizing DDR bandwidth utilization. In other words, the scheduler maximizes efficiency by introducing minimal latency without failing QOS requirements.

The scheduler's ability to maximize efficiency and meet QOS requirements depends on many factors—some are upstream, some are downstream, and some involve the scheduler itself. The complexity of the scheduling algorithm can change how these factors affect the scheduler's function. Upstream, the number of threads in the system that the scheduler manages and how many of these threads it can prioritize simultaneously affect how well the scheduler can function. Downstream, the ability of the memory controller and the external memory system to accept commands also affects how well the scheduler can function. For example, the DDR timings such as row cycle time (tRC) can affect how commands are sent. Another example is the ability of response data paths to take data. If an initiator is busy with a user logic component at a fault state, the buffer can quickly fill up and block further response from the memory. The scheduler may be provided information on DDR and system state that it can use in its scheduling algorithm. For example, the scheduler may know or sense which page is open in the DDR and preferentially send a request for that page if QOS requirements are met. A scheduler may route urgent requests first. Typically, a more complex scheduling algorithm would take into account more factors and can interface with the memory more efficiently. However, a highly complex scheduling algorithm is not always required. An electronic designer can use an EDA tool to select default algorithms and accord various weights depending on requirements for the system being designed. The designer can also write a scheduling algorithm in a hardware description language that can be implemented on the FPGA.

Figure 2:
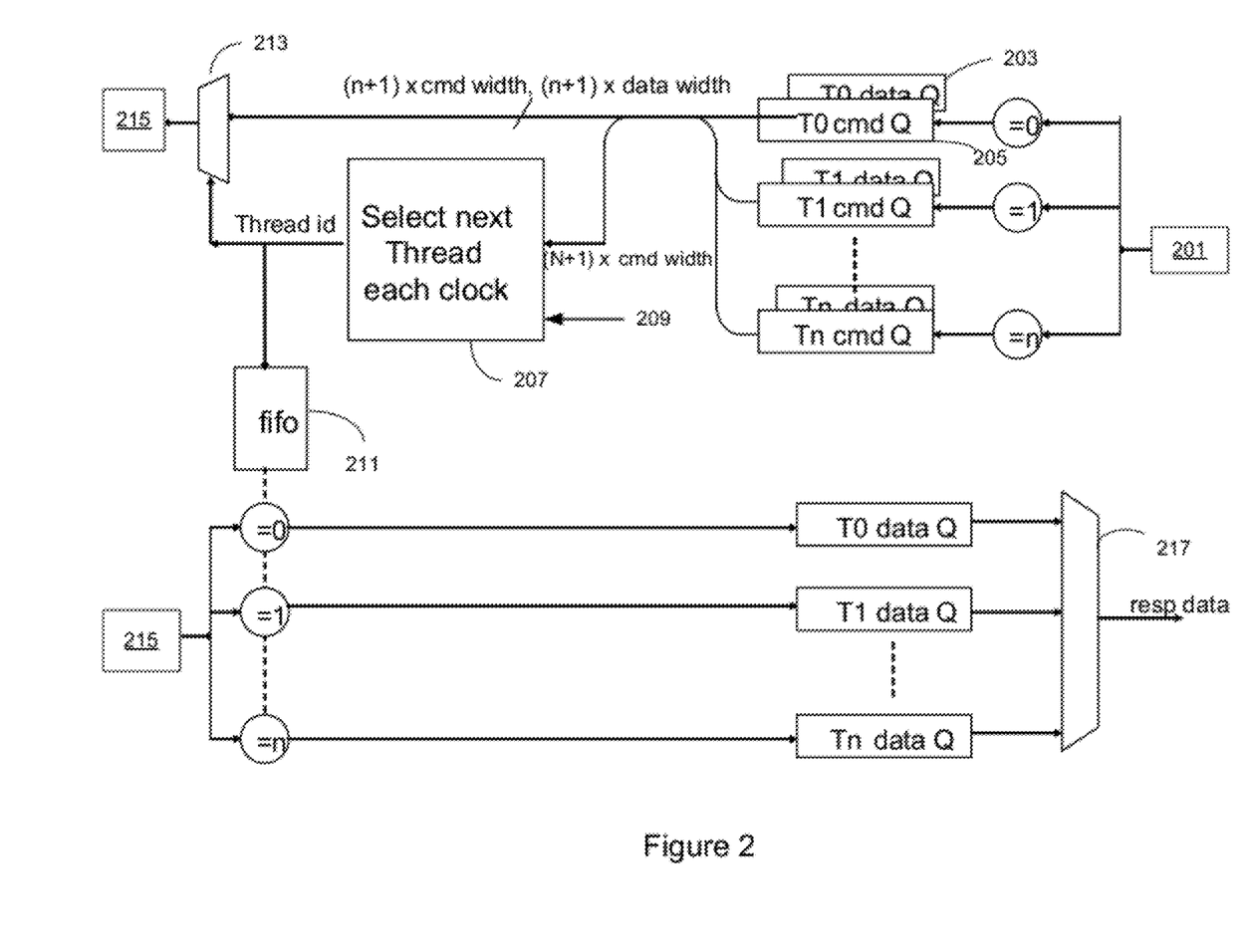
FIG. 2 is a block diagram of a scheduler structure according to various embodiments of the present invention.

FIG. 2 is a block diagram of an example scheduler. Commands with data (201) enter the scheduler at the top right and is placed into one of n+1 thread queues having each a command queue and a data queue. For example, thread 0 includes a data queue 203 and command queue 205. Scheduler logic 207 selects next thread at each clock cycle based on a number of inputs 209 that may be selected by the electronic designer. Examples of these inputs include whether to continue burst, whether a DDR bank is busy, the latency requirement per thread, the bandwidth requirement per thread, the current bus direction, and available space in the output queue. The scheduling algorithm selects the next thread and sends the thread id to FIFO logic 211 and multiplexer 213. The multiplexer 213 sends the command and data corresponding to the selected thread id to the next stage, which may be the memory controller.

The thread id is stored in the FIFO logic 211 and used to assign responses back to the correct thread id corresponding to the command that generated the response. Thus the number of response threads are the same as the number of command and write data threads. The data queue for each thread are then arbitrated onto the interconnect fabric via multiplexer 217.

An electronic system architect chooses the number of queues, queue depth, scheduling algorithm and allocations or weights given to various pieces of the system. Considerations include DDR width, DDR frequency, user logic frequency at the initiator, number of initiators, number of threads, anticipated traffic patterns, system design tradeoffs versus traffic patterns, logical to physical thread mapping, and others. Examples of system design tradeoffs versus traffic patterns include efficiency, latency, and bandwidth tradeoffs in the scheduling algorithm. Another example may be scheduling buffer requirements as the central buffer takes up valuable internal memory. The logical to physical thread mapping affects blocking on network number of initiators and therefore their traffic patterns. Smaller initiators may be grouped with higher bandwidth initiators to manage bandwidth and queue allocations. An electronic design automation system may offer a solution that meets requirements for a broad user base and allows customization by the system architect.

The scheduler functions in an FPGA are typically built in soft logic. In soft logic, the system architect can take build the scheduler in light of the various system requirement considerations, such as, how will the FPGA be used, the external memory and speed, etc. Most of these considerations are not known when the FPGA hardware is designed. In contrast, to the ASIC hardware designer is likely to how the ASIC will be used and to which external memory it would connect and can take them into account in the hardware design. Thus, soft-logic implementation of the scheduler offers flexibility but becomes increasingly more difficult as DDR frequencies and data widths increase. For example, at 400 MHz and data width of 256 bits, the non-deterministic FPGA routing resources and even temperature and voltage can adversely affect the tight timing to the DDR. One solution is pipelining, but pipelining can affect latency performance. Latency of 2-3 clock cycles in hard logic is difficult in the best ASIC implementations.

According to various embodiments, a flexible hard-logic memory interface for an FPGA is disclosed herein. The hard-logic solution includes multiple threads per initiator to allow initiator sharing. Physical thread queues are allocated in internal RAM and managed by pointers that are configured in soft logic or registers. The soft-logic management of physical threads offers the soft-logic flexibility with the hard-logic advantages of speed, performance, and deterministic routing without the latency problems.

Figure 3A:
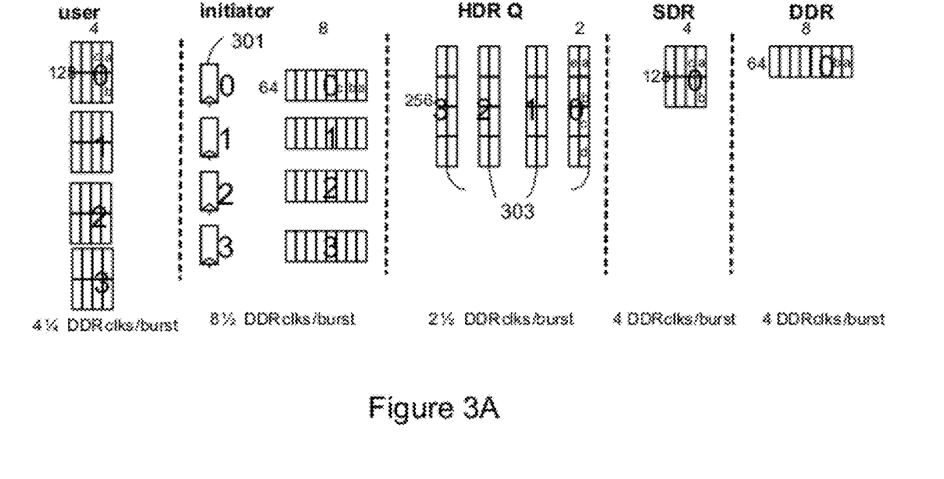
FIGS. 3A to 3D are data path schematics for various burst patterns in accordance with various embodiments of the present invention.

As discussed above, initiators may be grouped together to maximize bandwidth. FIGS. 3A to 3D are data path schematics for various burst patterns without such grouping. In FIG. 3A, a schematic for a 64 bit DDR is shown. Four-64 bit initiators (301) are used. The user logic is assumed to run at ¼ DDR frequency. In some cases, ½ DDR frequency may be used, resulting in 128 bit data width. Each burst is 64 bytes. According to this schematic, each initiator can use maximum of ¼ DDR bandwidth, and the write latency is increased by 7 or 8 clock cycles because the entire burst must reach the queue before sending to the memory controller. Each of physical initiator may use different logical threads, multiple logical threads if there are multiple user logic modules sharing the initiator, or same logical thread if there are ordering requirements between initiators. At each clock cycle, a 64 bit word is moved from each initiator to each of four physical thread queues 303. If multiple logical threads feed an initiator, then more thread queues may be required than initiators. If initiators share a thread with some ordering requirements between the initiators, then sideband signals may be used to manage this ordering.

Figure 3B:
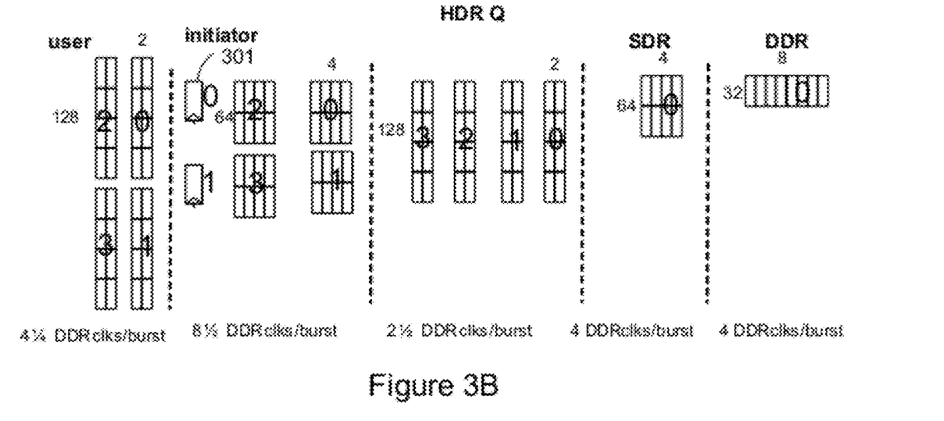

FIG. 3B shows a schematic for 32 bit DDR without initiator grouping. The user logic is at ¼ DDR frequency for 128 bit wide data. User logic at ½ DDR frequency may be used with 64 bit wide data. The initiators are assumed to be 64 bits. This schematic generates 32 bytes of data per burst. Each of the two initiators can use a maximum of ½ DDR bandwidth and the write latency is increased by 4 clock cycles.

Figure 3C:
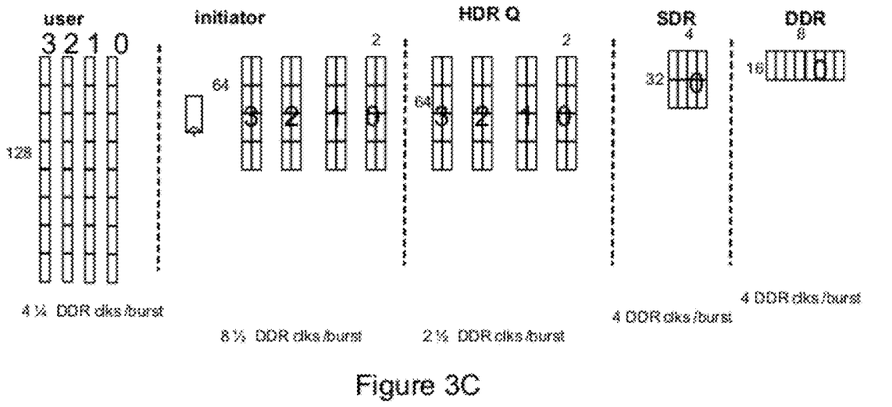

FIG. 3C shows a schematic for a 16 bit DDR without initiator grouping. The user logic is at ¼ DDR frequency for 128 bit wide data. User logic at ½ DDR frequency may be used with 64 bit wide data. The initiators are assumed to be 64 bits. This schematic generates 16 bytes of data per burst. Each initiator can use at a maximum all of the DDR bandwidth and the write latency is increased by 2 clock cycles.

Figure 3D:
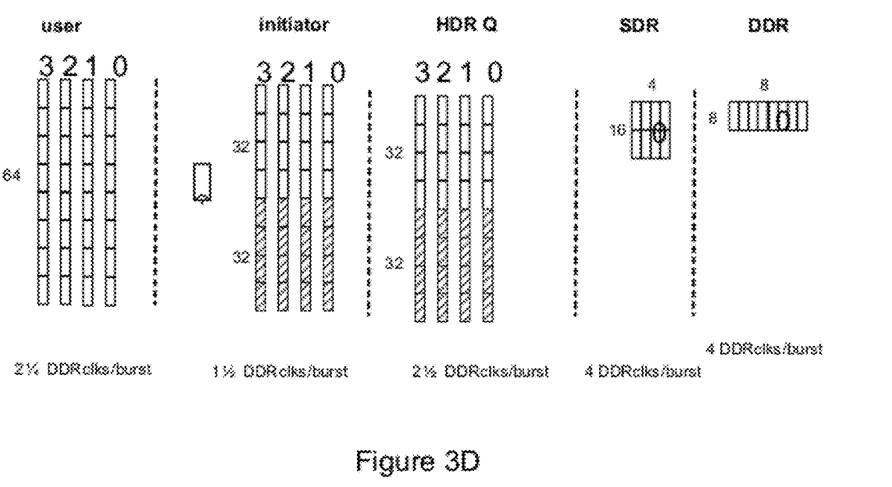

FIG. 3D shows a schematic for an 8 bit DDR without initiator grouping. The user logic is at ¼ DDR frequency for 128 bit wide data. User logic at ½ DDR frequency may be used with 64 bit wide data. The initiators are assumed to be 64 bits. This schematic generates 8 bytes of data per burst. Each initiator has the capacity to use twice of the bandwidth available. In this scenario, double bursts may be allowed into the system to provide bandwidth for back pressure recovery. However, this system may not be utilized often because the bandwidth is low.

Figure 4A:
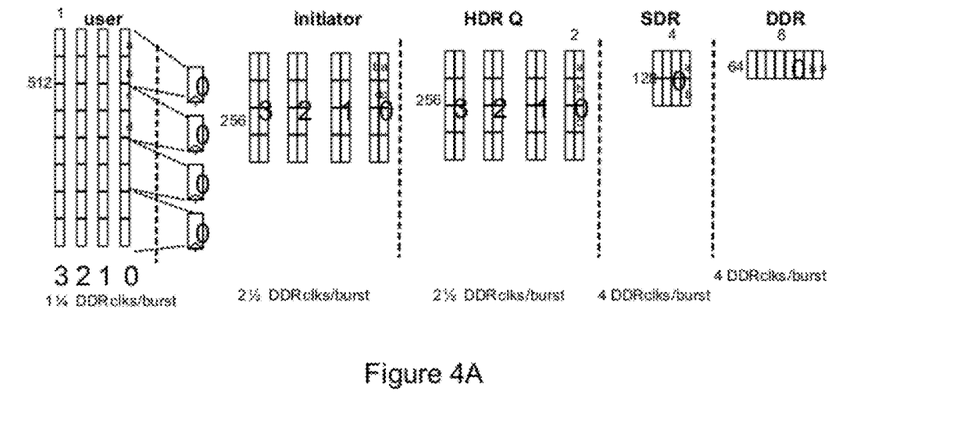
FIGS. 4A to 4B are data path schematics for various burst patterns with initiator grouping in accordance with various embodiments of the present invention.

FIGS. 4A and 4B show the schematics of FIGS. 3A and 3B, but with grouping. FIG. 4A shows the data path schematic for a 64 bit DDR. With grouping, each group of 4 initiators can use 100% of DDR bandwidth. Without this grouping a single initiator can only use 25% of the available bandwidth given that it is restricted to using a single port. As shown, the user logic data is 512 bits wide and placed into 256 bit wide data at the initiator. The data enters a different physical thread queue and increments pointers different so that it reordered to arrive at the DDR correctly. In this scenario, the user logic is assumed to run at ¼ DDR clock. If ½ DDR clock is used, then a group of 8 initiators would be used with an 8-port scheduler. As compared to FIG. 3A without grouping, the number of ½ DDR clocks/burst at the initiator and therefore latency is reduced.

Figure 4B:
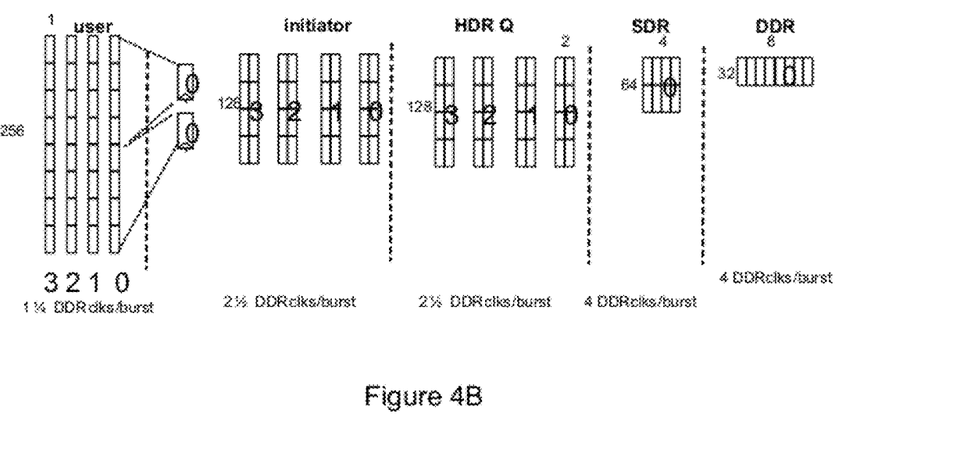

FIG. 4B shows a similar concept for a 32 bit DDR. As shown, the user logic data is 256 bits wide and placed into 128 bit wide data at the initiator. Each group of 2 initiators can use 100% of DDR bandwidth. In this scenario, the user logic is assumed to run at ¼ DDR clock. If ½ DDR clock is sued, then a group of 8 initiators would be used with an 8-port scheduler. As compared to FIG. 3B without grouping, the number of ½ DDR clocks/burst at the initiator and therefore latency is reduced.

For an FPGA the allocation of bandwidth to ports is not known at the hardware design stage, but a hard-logic implementation must be flexible to allow various configurations. According to various embodiments, a configurable bandwidth allocation in an FPGA using pointer based buffer allocation in a shared memory is disclosed.

At the hard-logic design, allocation of buffering requirements is as yet unknown because FPGA may be used for any number of applications. For example, packet sizes per write data or response data are unknown. For the command buffer and the write buffer, it is unknown which initiators will schedule most commands and how logical threads would be mapped to physical threads. Many logical threads may share a single port and/or physical ports may share logical thread. Physical ports may also be aggregated into larger bandwidth ports. The system trade offs of buffer depth versus scheduling efficiency versus allowed latency are also unknown. Command or write data may need to be forwarded based on latency requirements. For the response buffer, if there is no room in the response buffer, commands may not be scheduleable and shared threads may block one another. The response buffer may be throttled by initiator data rate; thus, the response buffer may need to be larger. Because replication of data may be required by multi-cast data transmission, the pointers may not be moved.

Figure 5:
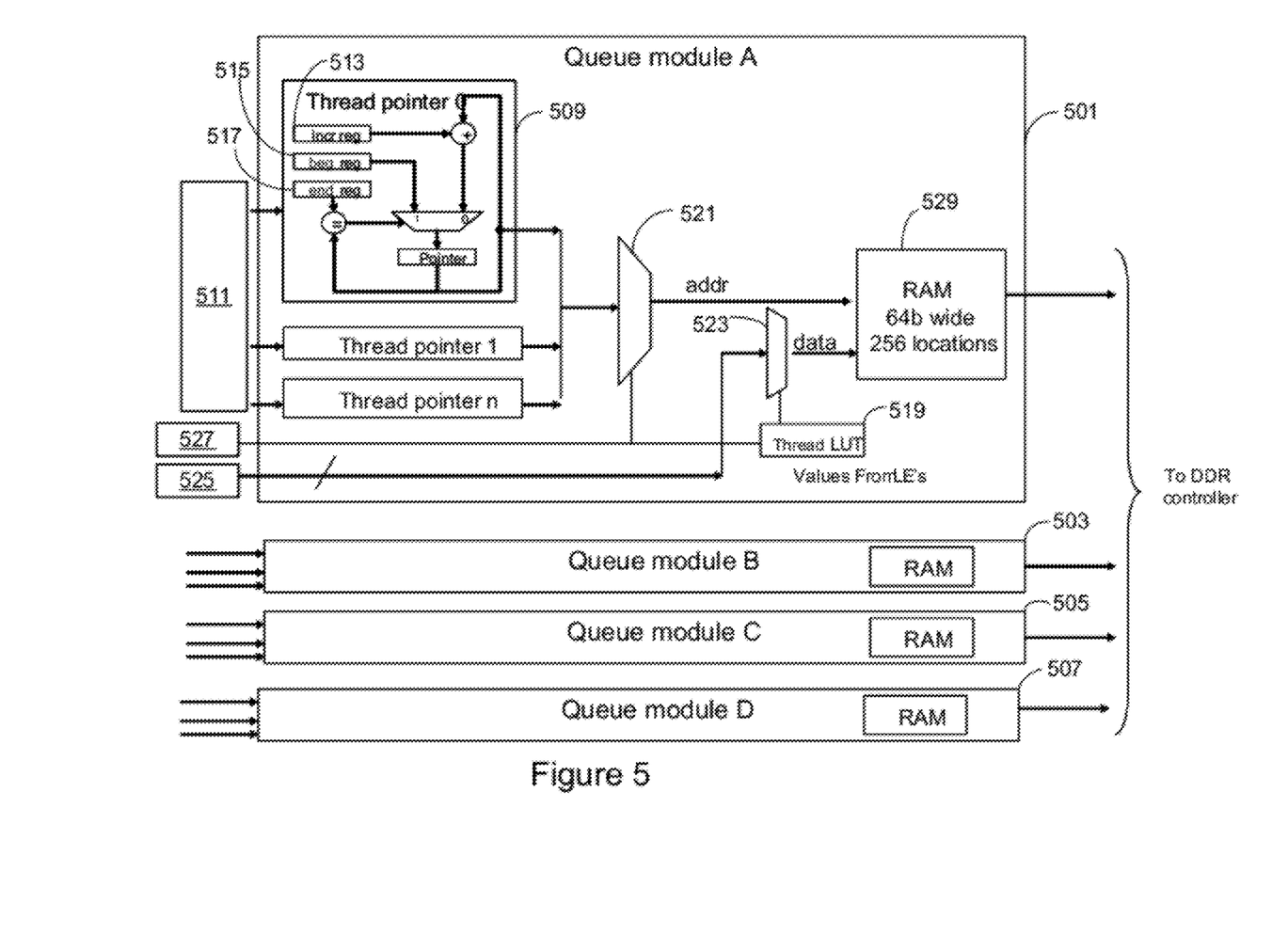
FIG. 5 is a block diagram of thread queues in accordance with various embodiments of the present invention.

According to various embodiments, thread queue modules as depicted in FIG. 5 can be implemented in hard-logic while retaining the flexibility of a soft-logic implementation. FIG. 5 is a block diagram of thread queue modules A-D (501, 503, 505, and 507), with details shown for queue module 501. Each queue module may have four physical threads for a total of 16 physical threads per memory interface. It is believed that 16 threads provide good bandwidth maximization and efficiency. However, more or fewer thread queues may be used.

The thread module 501 includes a number of thread pointers, preferably four. Each of the thread pointers, for example, 509, takes input values from logic elements 511. The logic elements 511 provide an incremental pointer value 513, a beginning value 515 and an ending value 517. The logic elements 511 may store a set of values statically or be updated from control logic or a processor. Logic elements 511 also provide contents of the thread look up table (LUT) 519. Using logic element 511, a control logic or a processor can manage command and write data buffers using the hard-logic queue module. Thread pointer 509 generates the next address pointer using the beginning pointer value and incrementing at each clock cycle until the end pointer value is achieved, when the process starts over with the beginning pointer value. The beginning and ending pointer values may be changed to adjust depth of each physical thread queue to meet bandwidth and backpressure requirements for each thread.

The pointer addresses from all thread pointers are sent to address multiplexer 521, which selects the address to pass through using the thread id of the command. The thread id of the command may be remapped or collapsed from the logical threads prior to the queue module. In certain embodiments, additional bits at the thread LUT may be used to convert the logical thread id to physical thread id. Command and/or data is associated with a logical thread id 527. The logical thread id is mapped onto a physical location in the RAM at the thread LUT 519. Data multiplexer 523 uses the mapped physical location to place the command and or data into the RAM 529 input data word, where the command and/or data is stored according to the address from the address multiplexer 521. One purpose of this placement is to accommodate the data alignment required for grouping of ports.

In certain embodiments, the input thread module may be separated into a command input thread module and a data input thread module. These modules may share a thread LUT 519.

The RAM 529 may be a central buffer memory or individual memories. In one embodiment, it may be 64 bit wide with 256 locations. The RAM 529 is selected to have good aspect ratio to allow efficient buffering.

According to certain embodiments of full bandwidth to 64 bit DDR, the data for threads are spread across all four queue modules. Multiple threads are held with separate thread pointers with the same thread id across the queue modules. When the data is read from the RAM, the burst is reconstructed from each RAM to constitute the original burst.

In other embodiments where less than 64 bit DDR is used, the data for threads can be put in fewer queue modules and thereby freeing other queue modules to allow for more simultaneous threads. Multiplexers may be used at the output to align data to smaller controller data path.

According to various embodiments, the scheduler can always see a parallel set of threads to optimize DDR usage. In certain aspects, the thread queue modules combine many logical threads into one virtual master for the scheduler. Command queue shape does not change as a function of sharing initiators as command width per thread does not change. The scheduler algorithm may be implemented in soft-logic by the system architect. The scheduler selects the next physical thread queue for each queue module to send to the DDR controller according to the algorithm.

As discussed above, the physical thread queue runs at a half data rate and the DDR controller runs at a full data rate (shown as SDR in FIGS. 3 and 4). The queue RAM can be used to convert the half data rate to full data rate and vice versa in the response queue. However, the data rate can also be converted by using an additional component.

A response data queue module is shown in FIG. 2. Response data is multiplexed onto various response data queues based on the FIFO logic 211. The response data is then arbitrated onto the interconnect fabric to the user logic modules.

Figure 6:
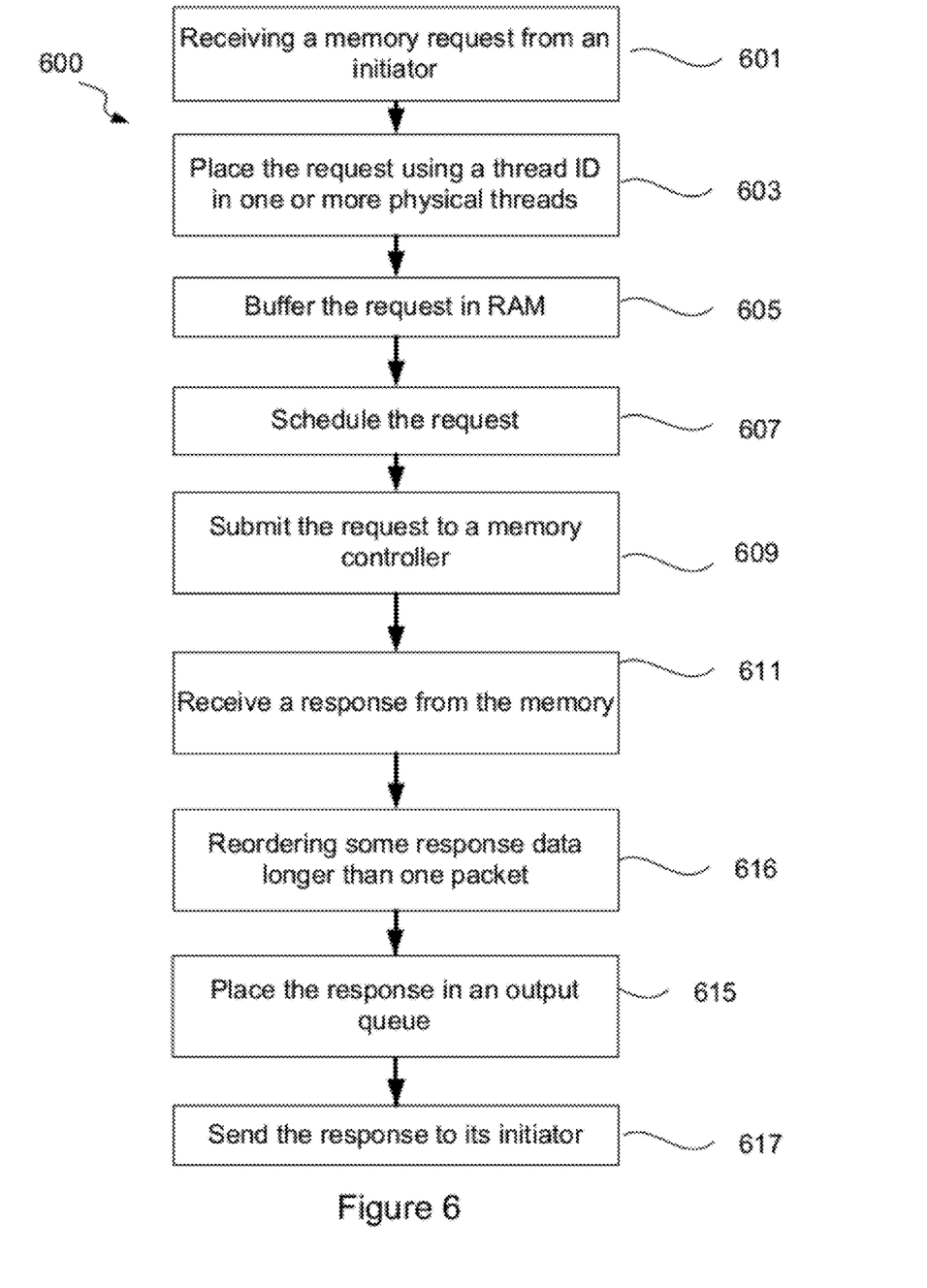
FIG. 6 is a process flow diagram of a transaction through the memory support interface in accordance with various embodiments of the present invention.

In another aspect in accordance with various embodiments of the present invention, a memory interface is disclosed herein as a technique for processing a memory request. FIG. 6 is a process flow diagram 600 of a transaction through the memory support interface. A memory request is received from an initiator at 601 and placed in one or more physical threads using a thread id at 603. As discussed above, depending on whether the initiators are grouped and the DDR size, a request may span several thread queue modules. The request is buffered in RAM in 605. A scheduler schedules the request among threads that it sees, at 607. When the thread is selected, the request is submitted to a memory controller at 609. A response is received from the memory at 611 and may be reordered. In some cases, the data is reordered if the data is longer than one packet in 616. This data reordering is the opposite of that described in association with FIG. 4A to put the response data in a burst for the user logic module. In other cases, the data is preordered and reordering is not necessary. The response is put in an output queue at 615 and sent to the initiator at 617.

Figure 7:
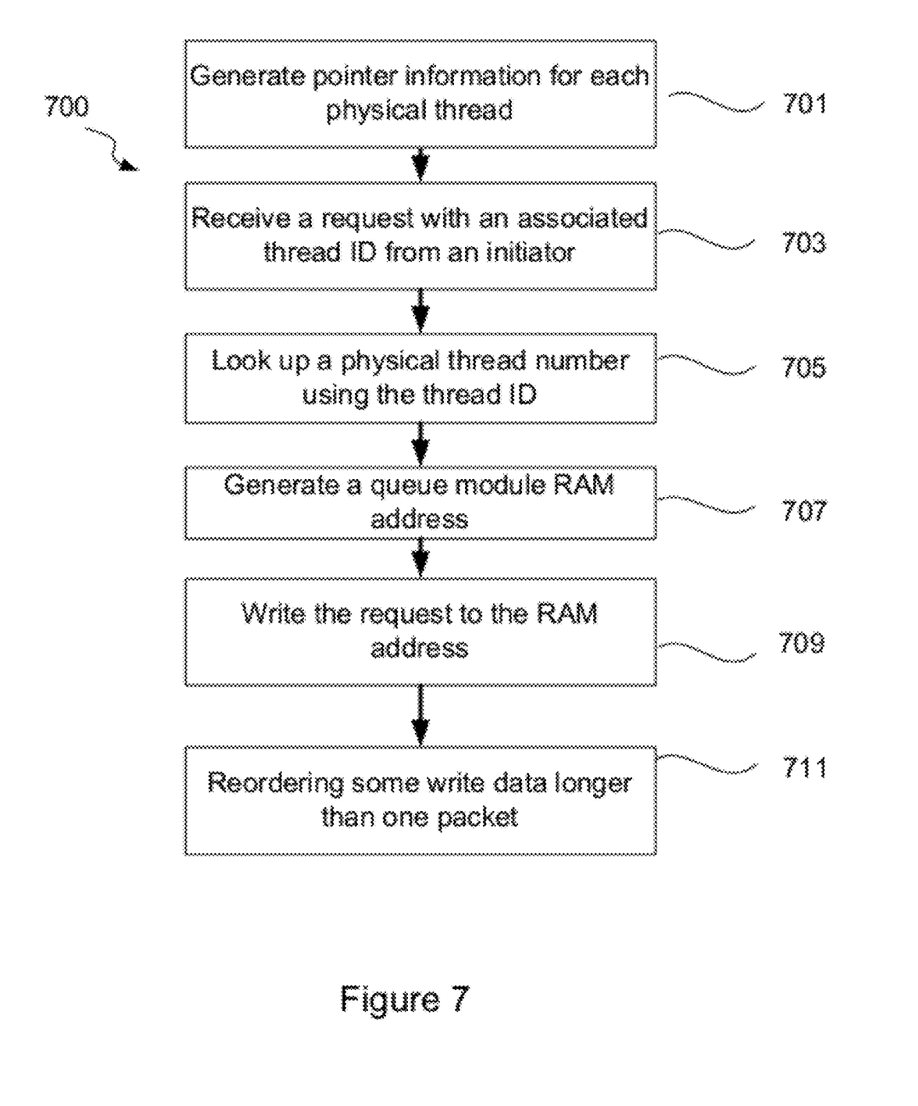
FIG. 7 is a process flow diagram of a memory request buffering in accordance with various embodiments of the present invention.

FIG. 7 is a process flow diagram 700 of a memory request buffering in accordance with various embodiments of the present invention. Pointer information for each physical thread is generated at 701. A memory request with an associated thread id from an initiator is received at 703. The memory request may be a read request or a write request. Using the thread id, a physical thread number is found from a look up table at 705. A queue module RAM address is generated at 707. The request is written to the generated RAM address at 709. In certain cases, write data longer than one packet may be written to the RAM in a reordered format at 711. Data reordering is disclosed in association with FIG. 4A.

An apparatus for implementing a programmable logic device that includes various embodiments of the invention may be specially constructed or it may be a general-purpose computer selectively activated or reconfigured by a computer program and/or data structure stored in the computer. Various general-purpose machines may be used with programs written in accordance with the teachings herein, or a more specialized apparatus may be constructed to perform the required method operations to implement a PLD.

Although the some of the techniques above have been described in the context of programming an FPGA with programmable logic and the FPGA having soft-logic and hard-logic portions, these techniques are also applicable in other contexts. For example, one skilled in the art of electronic design f can modify and practice the concepts disclosed herein for other types of PLDs and hybrid programmable devices.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A programmable logic device comprising:
a programmable soft-logic portion configurable by a programmed bit stream, said soft-logic portion comprising at least one initiator; and,
a hard-logic portion having an interconnect fabric and a memory interface structure, the memory interface structure comprising
a plurality of input queue modules including a plurality of physical thread pointers and a thread look-up table (LUT), wherein a request from a plurality of logical threads initiated by the at least one initiator is written onto a queue module random access memory (RAM) using the LUT and corresponding physical thread pointer; and
a plurality of output data queue modules to temporarily store responses from the RAM until arbitrated onto the interconnect fabric.

2. The programmable logic device of claim 1, wherein the memory interface structure further comprises a scheduler configured to select an ordering of requests for a memory controller.

3. The programmable logic device of claim 1, wherein any number of logical threads can be mapped onto the plurality of physical thread pointers for a queue module.

4. The programmable logic device of claim 1, wherein the plurality of input queue modules include data input queue modules and command input queue modules.

5. The programmable logic device of claim 1, wherein each input queue module further comprises a queue module RAM shared by a plurality of physical threads.

6. The programmable logic device of claim 1, wherein the soft-logic portion further comprises a plurality of queue module RAMs corresponding to the number of input queue modules.

7. The programmable logic device of claim 1, wherein the memory interface structure is configurable using double-data-rate (DDR) memory width and DDR memory frequency.

8. The programmable logic device of claim 1, wherein the memory interface structure is configurable using user logic frequency, number of initiators, number of threads, traffic patterns, quality of service requirements for each logical thread, logical thread association with initiators, and grouping of initiators to share bandwidth.

9. A method of supplying commands and data to a DDR controller on an field programmable gate array (FPGA), the method comprising:
generating pointer information for each of a plurality of physical threads in each of a plurality of queue modules implemented as hard-logic on the FPGA;
receiving a request with an associated logical thread identification (ID) from one of a plurality of initiators;
looking up a physical thread pointer number using the thread ID;
generating a queue module RAM address using the physical thread pointer number; and,
writing the request to the RAM address;
wherein the request is a read command or a write command, and requests for a physical thread pointer comprise a plurality of requests from threads having one or more thread IDs.

10. The method of claim 9, wherein requests for multiple physical thread pointers comprise one or more requests from a thread ID.

11. The method of claim 9, wherein the pointer information for each physical thread of the plurality of physical threads in each queue module of the plurality of queue modules comprises a beginning value, an end value, and an increment value, said beginning value corresponding to a starting location allocated to a physical thread pointer in a queue module RAM, said end value corresponding to an ending location allocated to an end pointer in the queue module RAM, and said increment value corresponding to a memory packet size.

12. The method of claim 9, wherein the plurality of physical threads is 4 physical threads per queue module.

13. The method of claim 9, wherein the plurality of queue modules is 4 queue modules.

14. The method of claim 9, further comprising reordering write data longer than one packet using an initiator and DDR burst widths.

15. A method of communicating data between initiators and a DDR memory in a programmable logic device (PLD), the method comprising:
receiving a memory request, the memory request having properties of a thread ID, an initiator ID, a bandwidth requirement, a latency requirement, and a priority code;
placing the request using the thread ID in one or more physical threads in one or more queue modules implemented as hard-logic on the PLD;
buffering the request in a queue module RAM, said queue module RAM being shared by a plurality of physical threads;

scheduling the request using the buffered memory request's properties, other scheduled requests, DDR memory state, and output queues states;
submitting the request to a DDR memory controller;
receiving a response from the DDR memory;
placing the response in an output queue; and,
sending the response to its initiator.

16. The method of claim 15, further comprising reordering a write request longer than one packet using an initiator and DDR burst widths.

17. The method of claim 15, wherein buffering the request in a queue module RAM comprises reading pointer information for a physical thread of the one or more physical threads and storing the request at a next pointer location.

18. The method of claim 17, wherein initial pointer information is generated by a PLD designer or a control logic implemented on the PLD as soft-logic.

19. The method of claim 18, wherein the initial pointer information is generated using a bandwidth and backpressure requirements for each physical thread.

20. The method of claim 15, wherein the placing the request in one or more physical threads comprises looking up a physical thread pointer number using the thread ID in a look-up table (LUT), said LUT data is generated by a PLD designer or a control logic implemented on the PLD as soft-logic.

21. The method of claim 15, further comprising converting the request from half data rate to full data rate in the queue module RAM.

22. The method of claim 15, further comprising converting the request from full data rate to half data rate in the output queue.

* * * * *